US010529163B2

(12) United States Patent
Liu et al.

(10) Patent No.: US 10,529,163 B2
(45) Date of Patent: Jan. 7, 2020

(54) SELF-ADAPTIVE IDENTIFICATION METHOD OF IDENTIFYING NEGOTIABLE INSTRUMENT AND DEVICE

(71) Applicant: GRG Banking Equipment Co., Ltd., Guangzhou, Guangdong (CN)

(72) Inventors: Mengtao Liu, Guangdong (CN); Rongqiu Wang, Guangdong (CN); Weifeng Wang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 53 days.

(21) Appl. No.: 15/774,560

(22) PCT Filed: Apr. 6, 2016

(86) PCT No.: PCT/CN2016/078506

§ 371 (c)(1),
(2) Date: May 8, 2018

(87) PCT Pub. No.: WO2017/092209

PCT Pub. Date: Jun. 8, 2017

(65) Prior Publication Data

US 2019/0340862 A1 Nov. 7, 2019

(30) Foreign Application Priority Data

Dec. 2, 2015 (CN) .......................... 2015 1 0874880

(51) Int. Cl.
*G06K 9/00* (2006.01)
*G07D 7/12* (2016.01)
(Continued)

(52) U.S. Cl.
CPC ........... *G07D 7/12* (2013.01); *G06K 9/00442* (2013.01); *G06K 9/036* (2013.01); *G06K 9/2054* (2013.01);
(Continued)

(58) Field of Classification Search
None
See application file for complete search history.

(56) References Cited

U.S. PATENT DOCUMENTS 6,731,785 B1 * 5/2004 Mennie .................... G07D 7/12 209/534
2007/0278065 A1 12/2007 Voser
(Continued)

FOREIGN PATENT DOCUMENTS

CN 101458836 A 6/2009
CN 101681532 A 3/2010
(Continued)

OTHER PUBLICATIONS

International Search Report and Written Opinion for Application No. PCT/CN2016/078506 dated Sep. 8, 2016.
(Continued)

*Primary Examiner* — Atiba O Fitzpatrick
(74) *Attorney, Agent, or Firm* — Wolf, Greenfield & Sacks, P.C.

(57) ABSTRACT

A method and a device for adaptively recognizing a value document are provided. The method includes: acquiring a collection parameter, and collecting a photoelectric signal of the value document; acquiring a photoelectric signal correction amount, and performing digital compensation on the photoelectric signal; performing feature extraction on the photoelectric signal subjected to the digital compensation to obtain a feature vector; inputting the feature vector to a preset classifier for recognition, to obtain a recognition result of the value document; acquiring a specific region on the value document; acquiring feature information of the photoelectric signal of the value document; calculating an accumulation component and a differential error of the value document; calculating a total correction amount of the photoelectric signal; updating the photoelectric signal correction amount and the collection parameter; and outputting the recognition result.

10 Claims, 6 Drawing Sheets

(51) Int. Cl.

| | |
|---|---|
| ***G07D 7/20*** | (2016.01) |
| ***G06K 9/03*** | (2006.01) |
| ***G06K 9/46*** | (2006.01) |
| ***G06K 9/20*** | (2006.01) |

(52) U.S. Cl.

CPC ............. *G06K 9/46* (2013.01); *G07D 7/2008* (2013.01); *G07D 7/2016* (2013.01); *G07D 7/2083* (2013.01)

(56) References Cited

U.S. PATENT DOCUMENTS

| | | | |
|---|---|---|---|
| 2013/0121539 | A1 | 5/2013 | Liang et al. |
| 2014/0284864 | A1 | 9/2014 | Miyashita |
| 2015/0220936 | A1 | 8/2015 | Liang et al. |
| 2016/0110940 | A1 | 4/2016 | Huang et al. |

FOREIGN PATENT DOCUMENTS

| | | | |
|---|---|---|---|
| CN | 101908241 | A | 12/2010 |
| CN | 101968903 | A | 2/2011 |
| CN | 102890841 | A | 1/2013 |
| CN | 103310528 | A | 9/2013 |
| CN | 105095895 | A | 11/2015 |
| EP | 1 868 166 | A2 | 12/2007 |
| EP | 2 782 076 | A1 | 9/2014 |
| JP | 2009059177 | A | 3/2009 |
| WO | WO 03/036572 | A2 | 5/2003 |

OTHER PUBLICATIONS

Extended European Search Report for European Application No. 16869523.7, dated Nov. 28, 2018.

* cited by examiner

SELF-ADAPTIVE IDENTIFICATION METHOD OF IDENTIFYING NEGOTIABLE INSTRUMENT AND DEVICE

This Application is a national stage filing under 35 U.S.C. 371 of International Patent Application Serial No. PCT/CN2016/078506, filed Apr. 6, 2016, entitled "SELF-ADAPTIVE IDENTIFICATION METHOD OF IDENTIFYING NEGOTIABLE INSTRUMENT AND DEVICE". Foreign priority benefits are claimed under 35 U.S.C. § 119(a)-(d) or 35 U.S.C. § 365(b) of Chinese application number 201510874880.X, filed Dec. 2, 2015. The entire contents of these applications are incorporated herein by reference in their entirety.

FIELD

The present disclosure relates to the field of finance, and in particular to a method and a device for adaptively recognizing a value document.

BACKGROUND

A large number of bill recognition and processing apparatuses are used due to circulation of cashes around the world, such as money counting machines, cash sorters and ATMs in banking systems, vending machines in the retail industry and ticket venders in the intelligent transportation industry. A common feature of these apparatuses is that detection and recognition on bills are performed by recognition devices. A photosensitive sensor and a recognition algorithm are important for any recognition device.

Since recognition devices are applied to different application industries, the recognition devices are required to be adaptive to different requirements and application environments. It is required that a photosensitive sensor and a recognition algorithm have certain adaptive capabilities. For example, the sensor is required to be adaptive to changes in temperature and humidity to ensure stability and consistency of signal output. The recognition algorithm is required to be adaptive to bills of different wear levels, different denominations and different versions to ensure stability and consistency of recognition.

In existing products, regarding the photosensitive sensor, generally an output signal of the photosensitive sensor is corrected using a white reference film according to a photoelectric signal feedback compensation principle, and regarding the recognition algorithm, generally an appropriate threshold is determined by training with a large number of samples of real bills to be processed, and then the threshold is applied to the algorithm as a parameter to meet a specific product requirement.

In a process of collecting target images using a CIS, an image with inhomogeneous intensity may be outputted for a target with a homogeneous gray due to factors such as optical inhomogeneity, difference in responses of photosensitive cells, dark currents and bias, thereby adversely affecting target recognition and measurement in subsequent image processing. Therefore, before collecting target images using the CIS, it is required to calibrate the CIS in black and white. At present, among the known CIS inhomogeneity correction algorithms, a two-point method is effective in correcting the CIS non-homogeneity, which is under an assumption that each photosensitive unit responds linearly. A response line of the photosensitive cell can be obtained by only performing calibration measurement at two points of the line, thereby correcting non-homogeneity. However, recognition accuracy of the apparatus may be affected due to degradation in accuracy of photosensitive signal of the value document by variations of light-emitters and light-receiving components over time.

According to a feedback control principle in process control, a feedback system mainly includes a proportion section, an integration section and a differentiation section. In a traditional white reference-based photoelectric signal feedback correction method, only the proportion section is used to perform correction by multiplying a feedback signal deviation with a scale factor. With this method, a deviation of a sensor itself can be corrected in real-time to some extents, while an accumulation error of the entire system formed by the sensor and the recognition algorithm cannot be processed due to lack of the integration feedback section. In addition, the sensor is passive and cannot proactively predict a change of an object to be processed. Therefore, with the traditional method, a change of an object to be processed cannot be sensed and correction cannot be performed in advance due to lack of the differentiation feedback section.

Therefore, it is required to improve the design of the entire feedback control system and bring the integration and differentiation feedback control sections, so as to solve the problem of system accumulation error and perform a correction in advance.

SUMMARY

A method and a device for adaptively recognizing a value document are provided according to the embodiments of the present disclosure, to solve the problem of system accumulation error and perform a correction in advance.

A method for adaptively recognizing a value document is provided according to an embodiment of the present disclosure, which includes:

acquiring a collection parameter, and collecting, based on the collection parameter, a photoelectric signal of the value document;

acquiring a photoelectric signal correction amount, and performing, based on the photoelectric signal correction amount, digital compensation on the photoelectric signal;

performing feature extraction on the photoelectric signal subjected to the digital compensation to obtain a feature vector;

inputting the feature vector to a preset classifier for recognition, to obtain a recognition result of the value document;

acquiring, based on the recognition result, a specific region on the value document;

acquiring, based on the specific region, feature information of the photoelectric signal of the value document;

calculating, based on the feature information, an accumulation component and a differential error of the value document;

calculating, based on the accumulation component and the differential error, a total correction amount of the photoelectric signal;

updating, based on the total correction amount, the photoelectric signal correction amount and the collection parameter; and outputting the recognition result.

Optionally, a correction equation for digital compensation is expressed by:

$$p'=p+M_0$$

where p represents a grey value of the photoelectric signal at any point, p' represents a corrected value of p, and $M_0$ represents the photoelectric signal correction amount.

Optionally, the calculating, based on the feature information, the accumulation component and the differential error of the value document includes:

calculating, based on the feature information, a feature component $M_n$ of the photoelectric signal, where the feature component is expressed by:

$$M_n = \sum_{i=1}^{t} \frac{\theta_i}{t},$$

represents the feature information, i=1, 2, . . . , t;

calculating the accumulation component $$M_1 = \sum_{i=1}^{t} \frac{m_i}{2^{t-i+1}}$$

of the value document, where m represents a value of the feature component $M_n$ at a time i; and calculating the differential error of the value document according to $M_w=M_n-M_1$, Optionally, the calculating, based on the accumulation component and the differential error, the total correction amount of the photoelectric signal includes:

calculating, based on the accumulation component, a second correction amount $M_2$ of the photoelectric signal according to $M_2=k_2*(M^*-M_1)$ where M* represents a preset standard information, and $k_2$ represents a preset second coefficient;

calculating, based on the differential error, a third correction amount $M_3$ of the photoelectric signal in the way that: if $\cdot|M_w|<w$, the third correction amount is calculated by $M_3=-M_w$; and if $|M_w|\geq w$, and the number of samples of the photoelectric signal satisfying the condition $|M_w|\geq w$ is n, the third correction amount is calculated by $M_3=0$ in a case of $$\frac{n}{N} < 0.1,$$

and the third correction amount is calculated by $M_3=-k_3*M_w$ in a case of $$\frac{n}{N} \geq 0.1,$$

where N represents a total number of the samples of the photoelectric signal, and $k_3$ represents a preset third coefficient; and obtaining, based on the accumulation component, the second correction amount and the third correction amount, the total correction amount according to $M=M_1+M_2+M_1$.

Optionally, the updating, based on the total correction amount, the photoelectric signal correction amount and the collection parameter includes:

updating the photoelectric signal correction amount $M_0$ to be equal to the total correction amount M; and initializing the collection parameter and updating the collection parameter according to $E_o=E_o\pm\lambda\cdot M_o$, where an initialization value of $E_0$ is preset, and $\lambda$ represents a preset correction coefficient.

Optionally, before the performing, based on the photoelectric signal correction amount, the digital compensation on the photoelectric signal, the method further includes:

acquiring a first correction coefficient and a second correction coefficient which are preset;

performing, based on the first correction coefficient and the second correction coefficient, signal compensation on the photoelectric signal according to the following compensation correction equation:

$$y=a\cdot x+b$$

where x represents an uncorrected value of the photoelectric signal at any point, y represents a corrected value of the photoelectric signal at the point, a represents the first correction coefficient, and b represents the second correction coefficient.

Optionally, in the first collection of the photoelectric signal of the value document, a preset initialization value of the collection parameter is acquired, an initialization value of the photoelectric signal correction amount is acquired, and the initialization value of the photoelectric signal correction amount is zero.

A device for adaptively recognizing a value document is further provided according to an embodiment of the present disclosure, which includes:

a photoelectric signal acquisition module configured to acquire a collection parameter and collect, based on the collection parameter, a photoelectric signal of the value document;

a digital compensation module configured to acquire a photoelectric signal correction amount and perform, based on the photoelectric signal correction amount, digital compensation on the photoelectric signal;

a feature extraction module configured to perform feature extraction on the photoelectric signal subjected to the digital compensation to obtain a feature vector;

a recognition module configured to input the feature vector to a preset classifier for recognition, to obtain a recognition result of the value document;

a specific region acquisition module configured to acquire, based on the recognition result, a specific region on the value document;

a feature information acquisition module configured to acquire, based on the specific region, feature information of the photoelectric signal of the value document;

an accumulation component and differential error calculation module configured to calculate, based on the feature information, an accumulation component and a differential error of the value document;

a total correction amount calculation module configured to calculate, based on the accumulation component and the differential error, a total correction amount of the photoelectric signal;

an updating module configured to update, based on the total correction amount, the photoelectric signal correction amount and the collection parameter; and a recognition result output module configured to output the recognition result.

Optionally, the accumulation component and differential error calculation module includes:

a feature component calculation unit configured to calculate, based on the feature information, a feature component $M_n$ of the photoelectric signal, where the feature component is expressed by:

$$M_n = \sum_{i=1}^{t} \frac{\theta_i}{t},$$

$\theta_i$ represents the feature information, i=1, 2, . . . , t;

an accumulation component calculation unit configured to calculate the accumulation component of the value document, where the accumulation component is expressed by:

$$M_1 = \sum_{i=1}^{t} \frac{m_i}{2^{t-i+1}},$$

$m_i$ represents a value of the feature component $M_n$ at a time i; and; and a differential error calculation unit configured to calculate the differential error of the value document according to $M_w = M_n - M_1$.

Optionally, the total correction amount calculation module includes:

a second correction amount calculation unit configured to calculate, based on the accumulation component, a second correction amount $M_2$ of the photoelectric signal according to $M_2 = k_2 * (M^* - M_t)$, where M* represents a preset standard information, and $k_2$ represents a preset second coefficient;

a third correction amount calculation unit configured to calculate, based on the differential error, a third correction amount $M_3$ of the photoelectric signal in the way that: if $\cdot|M_w| < w$, the third correction amount is expressed by $M_3 = -M_w$; and if $|M_w| \geq w$ and the number of samples of the photoelectric signal satisfying the condition $|M_w| \geq w$ is n, the third correction amount is calculated by $M_3 = 0$ in a case of $n/N < 0.1$, and the third correction amount is calculated by $M_3 = -k_3 * M_w$ in a case of $n/N \geq 0.1$, where N represents a total number of the samples of the photoelectric signal, $k_3$ represents a preset third coefficient; and a total correction amount calculation unit configured to obtain, based on the accumulation component, the second correction amount and the third correction amount, the total correction amount according to $M = M_1 + M_2 + M_3$.

Optionally, the updating module includes:

a photoelectric signal correction amount updating unit configured to update the photoelectric signal correction amount $M_0$ to be equal to the total correction amount M; and a collection parameter updating unit configured to initialize the collection parameter and updating the collection parameter according to $E_o = E_o + \lambda \cdot M_o$, where an initialization value of $E_0$ is preset, and $\lambda$ represents a preset correction coefficient.

Optionally, the device further includes:

a collection parameter initialization value acquisition module configured to acquire a preset initialization value of the collection parameter in the first collection of the photoelectric signal of the value document; and a correction amount initialization value acquisition module configured to acquire an initialization value of the photoelectric signal correction amount in the first collection of the photoelectric signal of the value document, where the initialization value of the photoelectric signal correction amount is zero.

It can be seen from the above technical solutions that the embodiments of the present disclosure have the following advantages. In the embodiments of the present disclosure, first, a collection parameter is acquired, and a photoelectric signal of the value document is collected based on the collection parameter. A photoelectric signal correction amount is acquired, and digital compensation is performed on the photoelectric signal based on the photoelectric signal correction amount. Then feature extraction is performed on the photoelectric signal subjected to the digital compensation to obtain a feature vector. The feature vector is inputted to a preset classifier for recognition, to obtain a recognition result of the value document. A specific region on the value document is acquired based on the recognition result. Feature information of the photoelectric signal of the value document is acquired based on the specific region. An accumulation component and a differential error of the value document are calculated based on the feature information. A total correction amount of the photoelectric signal is calculated based on the accumulation component and the differential error. Finally the photoelectric signal correction amount and the collection parameter are updated based on the total correction amount, and the recognition result is outputted. Therefore, adaptive accumulation feedback and adaptive differentiation feedback control can be realized in the value document recognition process to solve the problem of an accumulation error and a differential error of a system.

BRIEF DESCRIPTION OF THE DRAWINGS

In order to more clearly describe the technical solution in the embodiments of the present disclosure or the technical solution in the conventional technology, drawings to be used in the embodiments of the present disclosure or in the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION

A method and a device for adaptively recognizing a value document are provided according to the embodiments of the present disclosure, to solve the problem of system accumulation error and perform a correction in advance.

In order to make the objects, features and advantages of the present disclosure clearer, the technical solutions in the embodiments of the present disclosure are described clearly and completely in conjunction with the accompanying drawings in the embodiments of the present disclosure hereinafter. It is apparent that the below-described embodiments are merely some rather than all of embodiments of the present disclosure. All other embodiments obtained by those skilled in the art based on the embodiments in the present disclosure without any creative work should fall within the protection scope of the present disclosure.

Figure 1:
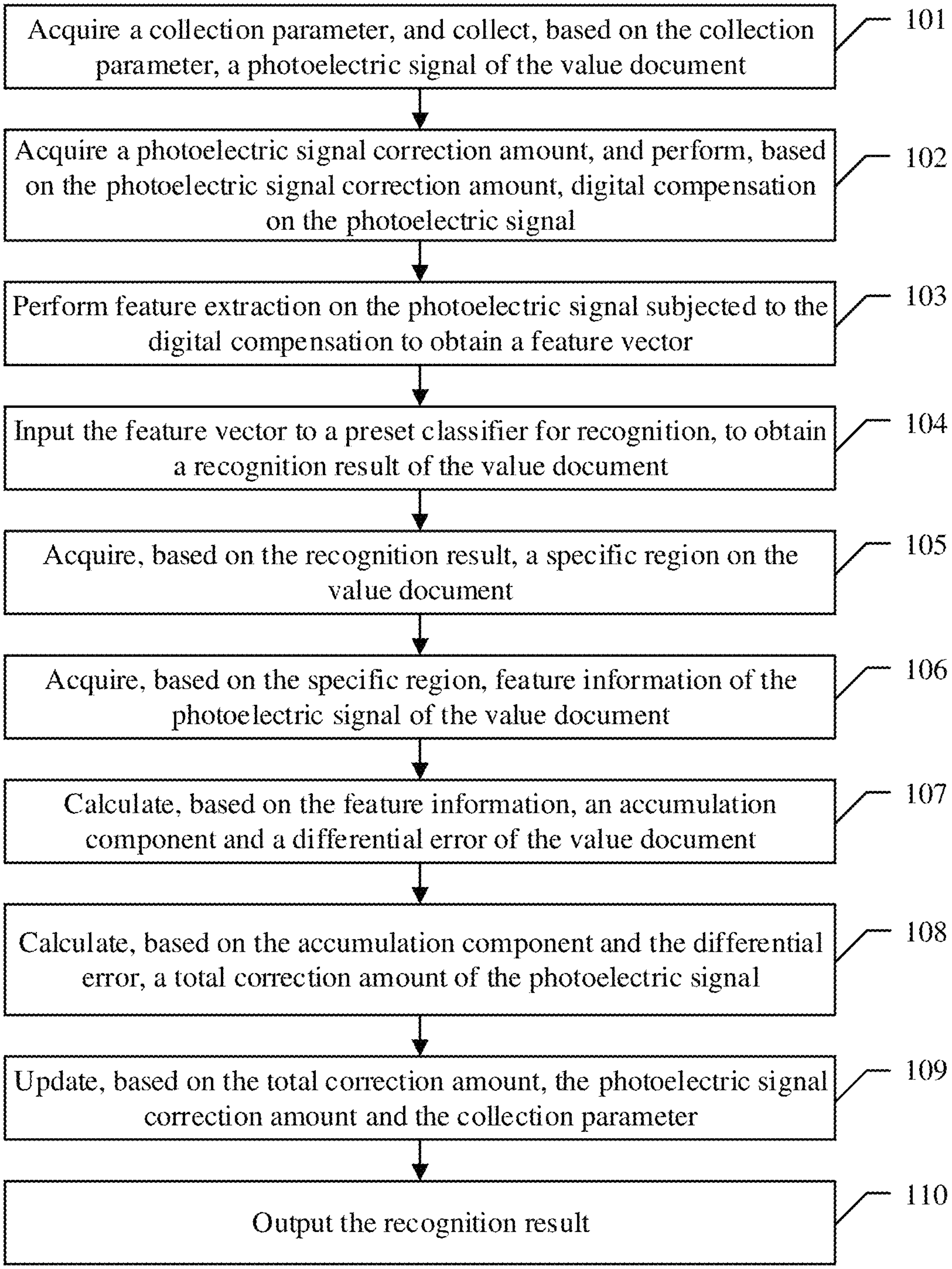
FIG. 1 is a flow chart of a method for adaptively recognizing a value document according to an embodiment of the present disclosure.

Referring to FIG. 1, a method for adaptively recognizing a value document according to an embodiment of the present disclosure includes the following steps 101 to 110.

In step 101, a collection parameter is acquired, and a photoelectric signal of the value document is collected based on the collection parameter.

The collection parameter may be acquired before the photoelectric signal of the value document is collected. Then the photoelectric signal of the value document may be collected based on the collection parameter.

In step 102, a photoelectric signal correction amount is acquired, and digital compensation is performed on the photoelectric signal based on the photoelectric signal correction amount.

After the photoelectric signal of the value document is collected based on the collection parameter, the photoelectric signal correction amount may be acquired. Then the digital compensation is performed on the photoelectric signal based on the photoelectric signal correction amount.

In step 103, feature extraction is performed on the photoelectric signal subjected to the digital compensation, to obtain a feature vector.

After the digital compensation is performed on the photoelectric signal based on the photoelectric signal correction amount, feature extraction is performed on the photoelectric signal subjected to the digital compensation, to obtain the feature vector.

In step 104, the feature vector is inputted to a preset classifier for recognition, to obtain a recognition result of the value document.

After the feature vector is obtained, the feature vector may be inputted to a preset classifier for recognition to obtain the recognition result of the value document.

In step 105, a specific region on the value document is acquired based on the recognition result.

After the recognition result of the value document is obtained, the specific region on the value document may be acquired based on the recognition result.

In step 106, feature information of the photoelectric signal of the value document is acquired based on the specific region.

After the specific region on the value document is acquired based on the recognition result, the feature information of the photoelectric signal of the value document may be acquired based on the specific region.

In step 107, an accumulation error and a differential error of the value document are calculated based on the feature information.

After the feature information of the photoelectric signal of the value document is acquired based on the specific region, the accumulation error and the differential error of the value document may be calculated based on the feature information.

In step 108, a total correction amount of the photoelectric signal is calculated based on the accumulation error and the differential error.

After the accumulation error and the differential error of the value document are calculated based on the feature information, the total correction amount of the photoelectric signal may be calculated based on the accumulation error and the differential error.

In step 109, the photoelectric signal correction amount and the collection parameter are updated based on the total correction amount.

After the total correction amount of the photoelectric signal is calculated based on the accumulation error and the differential error, the photoelectric signal correction amount and the collection parameter may be updated based on the total correction amount.

In step 110, the recognition result is outputted.

After the photoelectric signal correction amount and the collection parameter are updated based on the total correction amount, the recognition result may be outputted.

In the embodiment, first, a collection parameter is acquired, and a photoelectric signal of the value document is collected based on the collection parameter. A photoelectric signal correction amount is acquired, and digital compensation is performed on the photoelectric signal based on the photoelectric signal correction amount. Then feature extraction is performed on the photoelectric signal subjected to the digital compensation to obtain a feature vector. The feature vector is inputted to a preset classifier for recognition, to obtain a recognition result of the value document. A specific region on the value document is acquired based on the recognition result. Feature information of the photoelectric signal of the value document is acquired based on the specific region. An accumulation component and a differential error of the value document are calculated based on the feature information. A total correction amount of the photoelectric signal is calculated based on the accumulation component and the differential error. Finally, the photoelectric signal correction amount and the collection parameter are updated based on the total correction amount, and the recognition result is outputted. Therefore, adaptive accumulation feedback and adaptive differentiation feedback control can be realized in the value document recognition process to solve the problem of an accumulation error and a differential error of a system.

Figure 2:
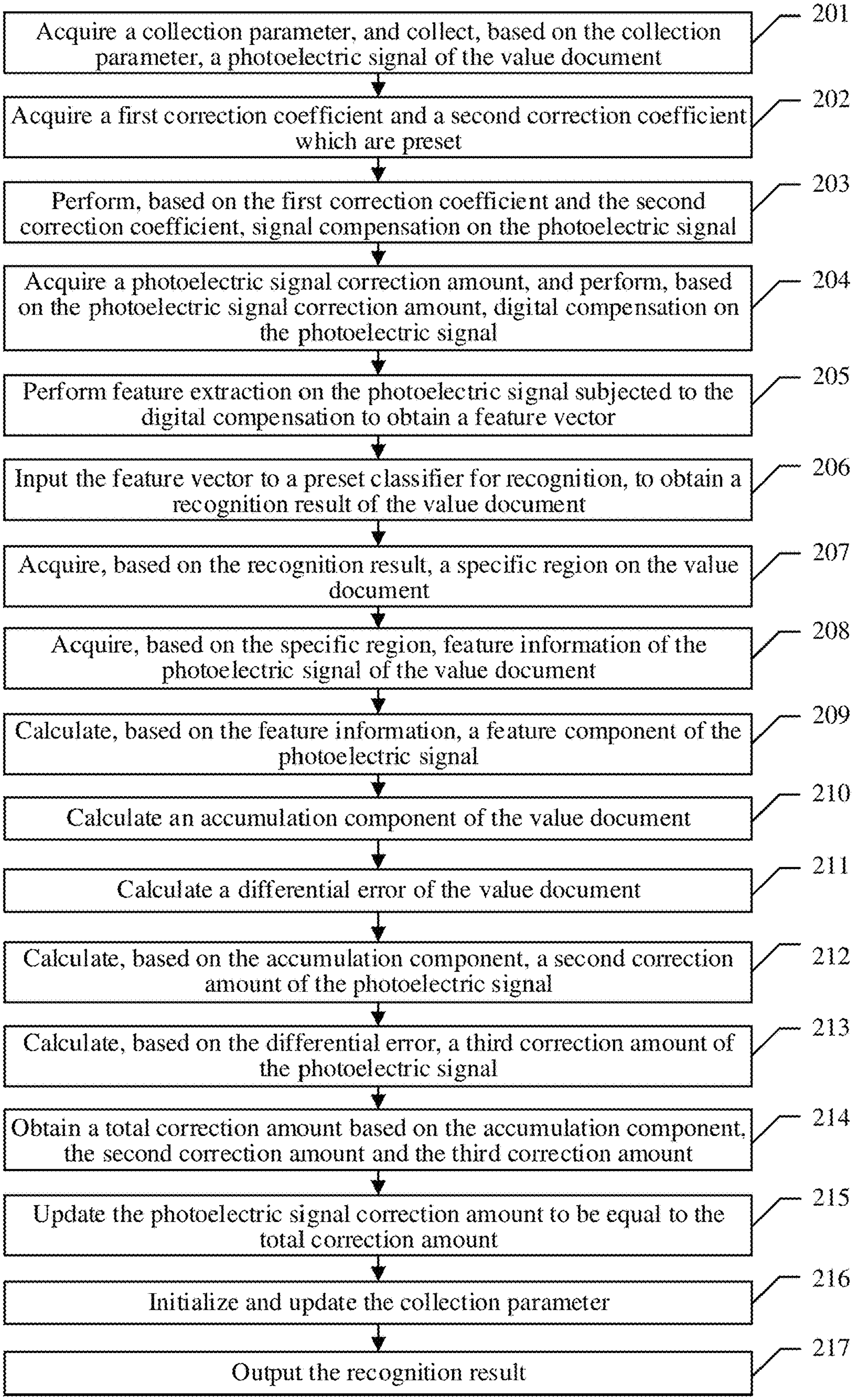
FIG. 2 is a flow chart of a method for adaptively recognizing a value document according to another embodiment of the present disclosure.

For a better understanding, the method for adaptively recognizing the value document according to an embodiment of the present disclosure is described in detail. Referring to FIG. 2, a method for adaptively recognizing a value document according to another embodiment of the present disclosure includes the following steps 201 to 217.

In step 201, a collection parameter is acquired, and a photoelectric signal of a value document is collected based on the collection parameter.

First, a collection parameter may be acquired, and a photoelectric signal of a value document may be collected based on the collection parameter.

It is noted that, in the first collection of the photoelectric signal of the value document, a preset initialization value of the collection parameter is acquired and an initialization value of the photoelectric signal correction amount is acquired. The initialization value of the photoelectric signal correction amount is zero.

In step 202, a first correction coefficient and a second correction coefficient which are preset are acquired.

Before the digital compensation, signal compensation may be performed on the photoelectric signal. It is required to acquire the first correction coefficient and second correction coefficient which are preset. It is noted that the first correction coefficient and the second correction coefficient may be calculated in advance by, for example, acquiring a response line of a photosensitive unit using a white proof and a black proof and substituting the result into a correction equation: y=a·x+b (the signal compensation by a two-point method) to calculate a correction coefficient (the first correction coefficient) and a dark current correction amount (the second correction coefficient).

In step 203, signal compensation is performed on the photoelectric signal based on the first correction coefficient and the second correction coefficient.

After the preset first correction coefficient and second correction coefficient are acquired, the signal compensation may be performed on the photoelectric signal based on the first correction coefficient and the second correction coefficient. Taking the two-point method as an example in the embodiment, a correction equation is expressed by:

$$y=a\cdot x+b;$$

where x represents an uncorrected value of the photoelectric signal at any point, y represents a corrected value of the photoelectric signal at the point, a represents the first correction coefficient, and b represents a second correction coefficient.

In step 204, a photoelectric signal correction amount is acquired, and digital compensation is performed on the photoelectric signal based on the photoelectric signal correction amount.

After the signal compensation is performed on the photoelectric signal based on the first correction coefficient and the second correction coefficient, the photoelectric signal correction amount may be acquired, and the digital compensation is performed on the photoelectric signal based on the photoelectric signal correction amount according to the following correction equation:

$$p'=P+M_0$$

where p represents a gray value of the photoelectric signal at any point, p' represents a corrected value of p, and $M_0$ represents the photoelectric signal correction amount. It is apparent that the corrected value is completely the same as an expected value. The gray value is increased if $M_0>0$, and the gray value is decreased if $M_0<0$.

In step 205, feature extraction is performed on the photoelectric signal subjected to the digital compensation to obtain a feature vector.

After the photoelectric signal correction amount is acquired and the digital compensation is performed on the photoelectric signal based on the photoelectric signal correction amount, the feature extraction may be performed on the photoelectric signal subjected to the digital compensation to obtain a feature vector which may be expressed by: $\beta=(\varepsilon_1, \varepsilon_2, \ldots, \varepsilon_t)$.

In step 206, the feature vector is inputted into a preset classifier for recognition, to obtain a recognition result of the value document.

After the feature vector is obtained, the feature vector may be inputted into the preset classifier for recognition, to obtain the recognition result of the value document. The classifier may be, but not limited to, a neural network or a support vector machine.

In step 207, a specific region on the value document is acquired based on the recognition result.

After the recognition result of the value document is obtained, the specific region on the value document may be acquired based on the recognition result.

In step 208, feature information of the photoelectric signal of the value document is acquired based on the specific region.

After the specific region on the value document is acquired based on the recognition result, the feature information of the photoelectric signal of the value document may be acquired based on the specific region.

In step 209, a feature component of the photoelectric signal is calculated based on the feature information.

After the feature information of the photoelectric signal of the value document is acquired based on the specific region, the feature component of the photoelectric signal may be calculated based on the feature information. The feature component $M_n$ is expressed by:

$$M_n=\sum_{i=1}^{t}\frac{\theta_i}{t}$$

where $\theta_i$ represents the feature information, i=1, 2, . . . , t.

Figure 3:
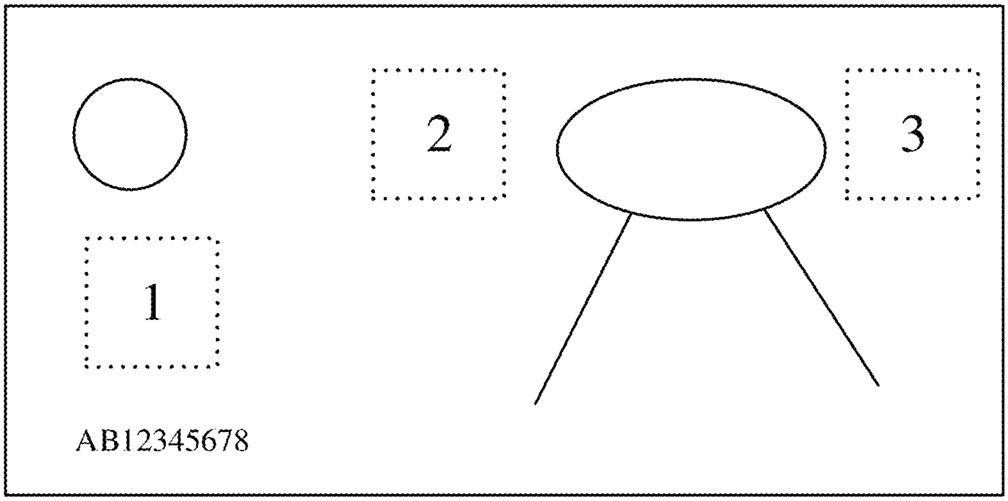
FIG. 3 shows selection of stable rectangular regions from a white light transmitting image having a prefixed number.

Steps 207 to 209 are described in detail through specific application scenarios hereinafter. As shown in FIG. 3, feature information $\theta_i$, i=1, 2, 3 on luminance, chrominance, saturation or contrast of preset rectangle region 1, rectangle region 2 and rectangle region 3 are acquired, to obtain a photoelectric signal feature ·

$$m_n=\sum_{i=1}^{3}\theta_i$$

of the value documents, where n represents an input sequence number of the value documents.

In step 210, an accumulation component of the value document is calculated.

After the feature component of the photoelectric signal is calculated based on the feature information, the accumulation component $$M_1=\sum_{i=1}^{t}\frac{m_i}{2^{t-i+1}}$$

of the value document may be calculated, where m represents a value of the feature component $M_n$ at a time i.

In step 211, a differential error of the value document is calculated.

Figure 4:
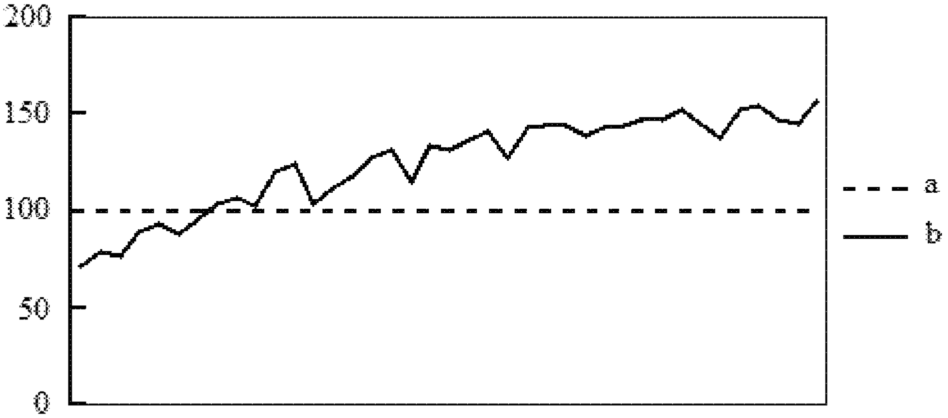
FIG. 4 is a schematic diagram showing output of feature information of a value document according to the present disclosure.

After the accumulation component of the value document is calculated, the differential error of the value document may be calculated. As shown in FIG. 4, a represents a photoelectric feature curve of the value document, b represents a standard curve, and $M_1$ represents the accumulation component, where $$M_1=\sum_{i=1}^{n}\frac{m_i}{2^{n-i+1}}.$$

Figure 5:
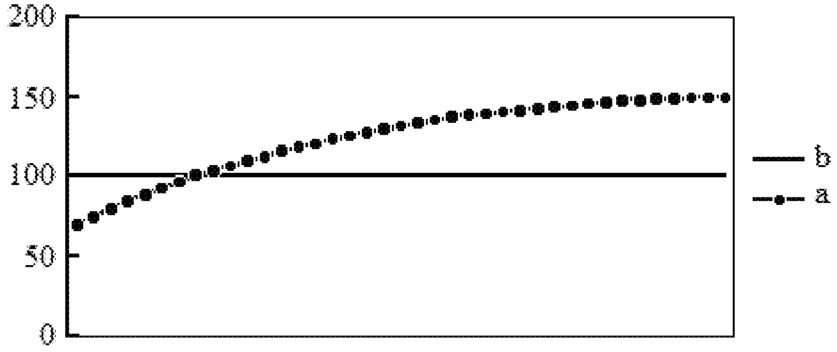
FIG. 5 is a schematic diagram showing an accumulation component according to the present disclosure.
Figure 6:
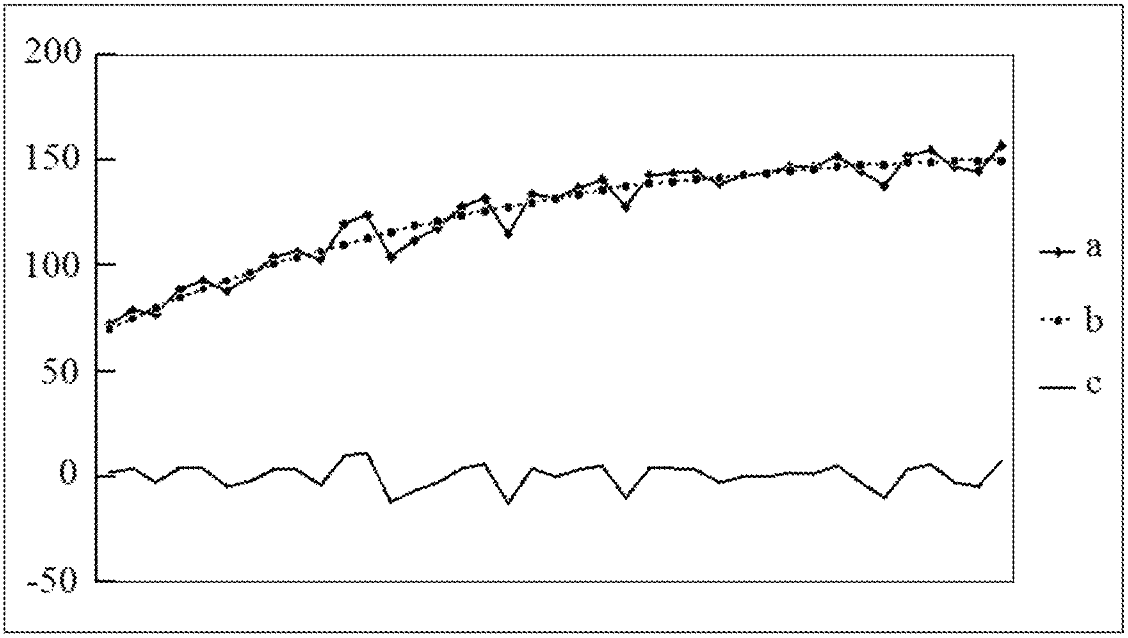
FIG. 6 is a schematic diagram showing a differential error according to the present disclosure.

As shown in FIG. 5, a represents an accumulation component curve, b represents a standard curve, an accumulation error, that is, the signal correction amount, is calculated according to $M_2=k_2*(M^*-M_1)$, where M* represents preset standard information, and $k_2$ represents an empirical value. As shown in FIG. 6, c represents an accumulation error curve, and the differential error $M_w$ of the photoelectric signal of the value document is calculated by: $M=M_n-M_1$.

In step 212, a second correction amount of the photoelectric signal is calculated based on the accumulation component.

After the accumulation component of the value document is calculated, the second correction amount $M_2$ of the photoelectric signal may be calculated based on the accumulation component according to $M_2=k_2*(M^*-M_t)$, where M* represents a preset standard information, and $k_2$ represents a preset second coefficient.

In step 213, a third correction amount of the photoelectric signal is calculated based on the differential error.

After the differential error of the value document is calculated, a third correction amount $M_3$ of the photoelectric signal may be calculated based on the differential error in the way that: if $\cdot|M_w|<w$, the third correction amount is calculated by $M_3=-M_w$; and if $|M_w|\geq w$ and the number of samples of the photoelectric signal satisfying the condition $|M_w|\geq w$ is n, the third correction amount is calculated by $M_3=0$ in a case of $n/N<0.1$, and the third correction amount is calculated by $M_3=-k_3*M_w$ in a case of $n/N\geq 0.1$, where N represents a total number of the samples of the photoelectric signal, and $k_3$ represents a preset third coefficient.

In step 214, a total correction amount is obtained based on the accumulation component, the second correction amount and the third correction amount.

After the accumulation component, the second correction amount and the third correction amount are acquired, the total correction amount may be obtained based on the accumulation component, the second correction amount and the third correction amount according to $M=M_1+M_2+M_3$.

In step 215, the photoelectric signal correction amount $M_0$ is updated to be equal to the total correction amount M.

After the total correction amount is acquired based on the accumulation component, the second correction amount and the third correction amount, the photoelectric signal correction amount $M_0$ may be updated to be equal to the total correction amount M.

In step 216, the collection parameter is initialized and updated.

After the photoelectric signal correction amount $M_0$ is updated, the collection parameter may be initialized and the collection parameter may be updated according to $E_o=E_o+\lambda\cdot M_o$, where an initialization value of $E_0$ is preset, and $\lambda$ represents a preset correction coefficient and indicates a photoelectric intensity averagely required to be increased by for increasing the gray value by 1 in a normal lighting range of a CIS.

In step 217, the recognition result is outputted.

After the collection parameter and the collection parameter are updated, the recognition result may be outputted.

In a case where the recognition device is degraded, the linearity of the recognition device is lost. A large error may be generated with the method of correcting the photoelectric signal by a "linear feedback and analysis module" using the proportion section, such that a region having a prefixed number may be overexposed or underexposed, thereby affecting the recognition. In the embodiment, with the method for adaptively recognizing a value document, a problem where a prefixed number is not recognized effectively due to degradation of the recognition device can be solved.

In a case where the recognition device is degraded or a brand new bill is inputted, if a white light transmitting image is too dark or too bright, the photoelectric intensity is increased or decreased by the system with the accumulation feedback adaptive method. In this way, when the bill is inputted again, the problem of the overexposed or underexposed white light transmitting image can be avoided.

In the embodiments of the present disclosure, first, a collection parameter is acquired, and a photoelectric signal of the value document is collected based on the collection parameter. A photoelectric signal correction amount is acquired, and digital compensation is performed on the photoelectric signal based on the photoelectric signal correction amount. Then feature extraction is performed on the photoelectric signal subjected to the digital compensation to obtain a feature vector. The feature vector is inputted to a preset classifier for recognition, to obtain a recognition result of the value document. A specific region on the value document is acquired based on the recognition result. Feature information of the photoelectric signal of the value document is acquired based on the specific region. An accumulation component and a differential error of the value document are calculated based on the feature information. A total correction amount of the photoelectric signal is calculated based on the accumulation component and the differential error. Finally, the photoelectric signal correction amount and the collection parameter are updated based on the total correction amount, and the recognition result is outputted. Therefore, adaptive accumulation feedback and adaptive differentiation feedback control can be realized in the value document recognition process to solve the problem of an accumulation error and a differential error of a system.

Figure 7:
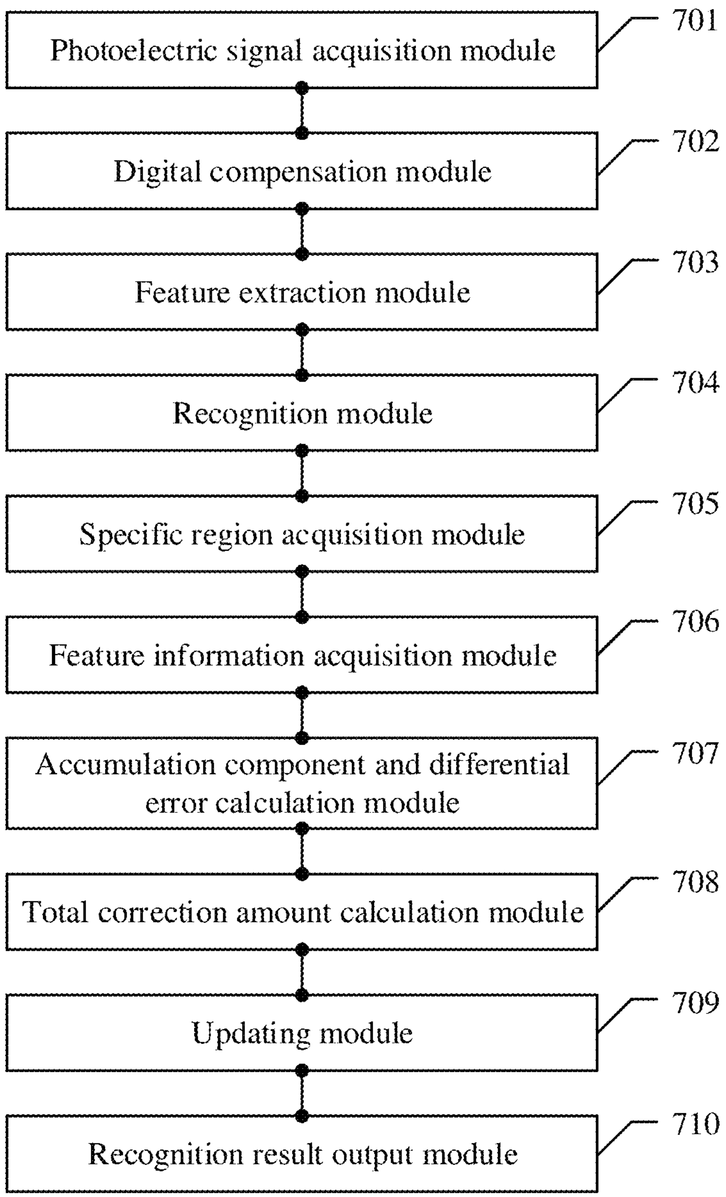
FIG. 7 is a structural diagram of a device for adaptively recognizing a value document according to an embodiment of the present disclosure.

The method for adaptively recognizing a value document is mainly described above. Hereinafter, a device for adaptively recognizing a value document is described in detail. Referring to FIG. 7, the device for adaptively recognizing a value document according to an embodiment of the present disclosure includes the following modules 701 to 710.

A photoelectric signal acquisition module 701 is configured to acquire a collection parameter and collect, based on the collection parameter, a photoelectric signal of the value document.

A digital compensation module 702 is configured to acquire a photoelectric signal correction amount and perform, based on the photoelectric signal correction amount, digital compensation on the photoelectric signal.

A feature extraction module 703 is configured to perform feature extraction on the photoelectric signal subjected to the digital compensation to obtain a feature vector.

A recognition module 704 is configured to input the feature vector to a preset classifier for recognition, to obtain a recognition result of the value document.

A specific region acquisition module 705 is configured to acquire, based on the recognition result, a specific region on the value document.

A feature information acquisition module 706 is configured to acquire, based on the specific region, feature information of the photoelectric signal of the value document.

An accumulation component and differential error calculation module 707 is configured to calculate, based on the feature information, an accumulation component and a differential error of the value document.

A total correction amount calculation module 708 is configured to calculate, based on the accumulation component and the differential error, a total correction amount of the photoelectric signal.

An updating module 709 is configured to update, based on the total correction amount, the photoelectric signal correction amount and the collection parameter.

A recognition result output module 710 is configured to output the recognition result.

In the embodiment, first the photoelectric signal acquisition module 701 acquires a collection parameter and collects, based on the collection parameter, a photoelectric signal of the value document. The digital compensation module 702 acquires a photoelectric signal correction amount and performs, based on the photoelectric signal correction amount, digital compensation on the photoelectric signal. Then the feature extraction module 703 performs feature extraction on the photoelectric signal subjected to the digital compensation to obtain a feature vector. The recognition module 704 inputs the feature vector to a preset classifier for recognition, to obtain a recognition result of the value document. The specific region acquisition module 705 acquires, based on the recognition result, a specific region on the value document. The feature information acquisition module 706 acquires, based on the specific region, feature information of the photoelectric signal of the value document. Then the accumulation component and differential error calculation module 707 calculates, based on the feature information, an accumulation component and a differential error of the value document. The total correction amount calculation module 708 calculates, based on the accumulation component and the differential error, a total correction amount of the photoelectric signal. The updating module 709 updates, based on the total correction amount, the photoelectric signal correction amount and the collection parameter. Finally the recognition result output module 710 outputs the recognition result. Therefore, adaptive accumulation feedback and adaptive differentiation feedback control can be realized in the value document recognition process to solve the problem of an accumulation error and a differential error of a system.

Figure 8:
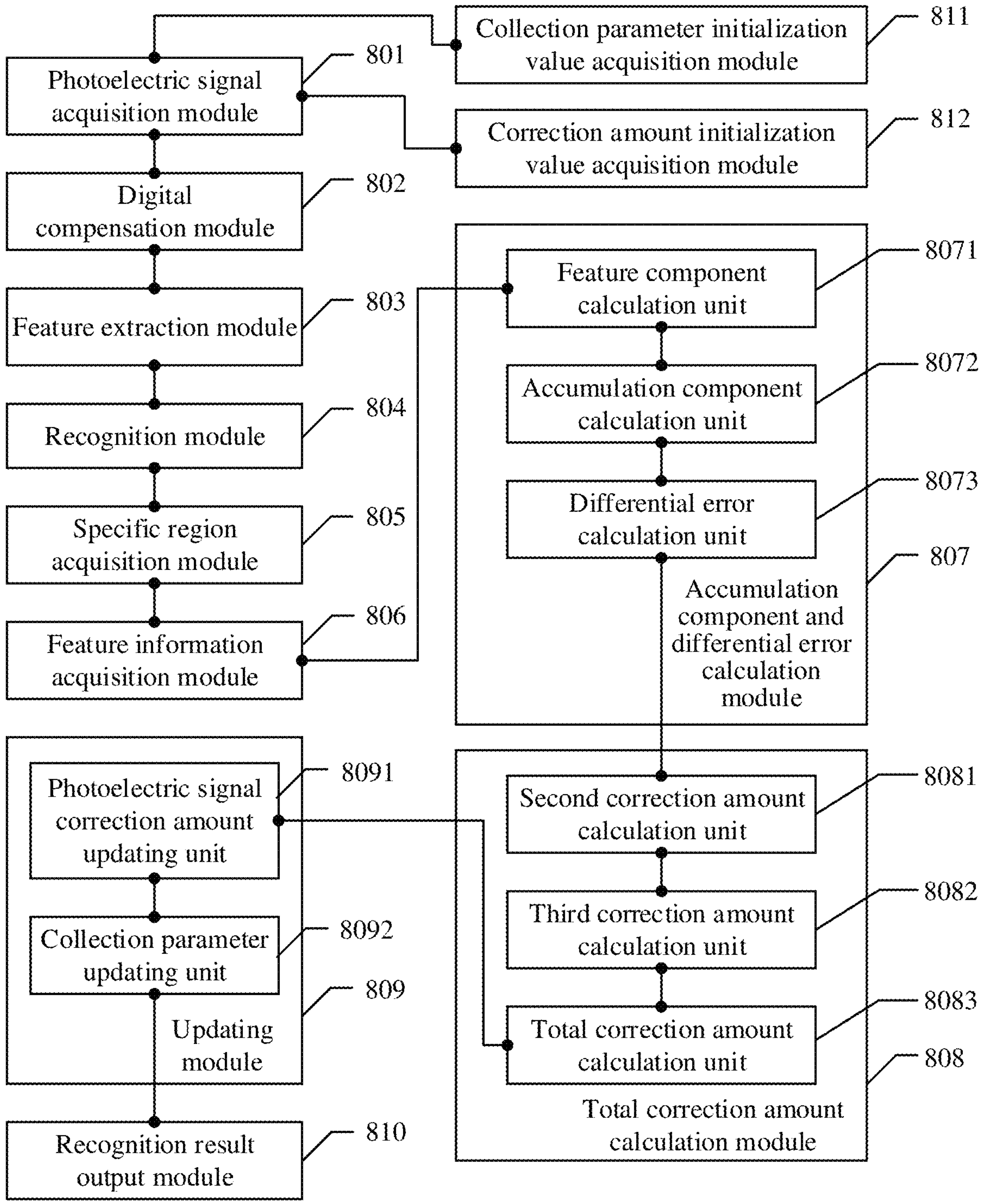
FIG. 8 is a structural diagram of a device for adaptively recognizing a value document according to another embodiment of the present disclosure.

For a better understanding, the device for adaptively recognizing a value document according to an embodiment of the present disclosure is described in detail hereinafter. Referring to FIG. 8, the device for adaptively recognizing a value document according to another embodiment of the present disclosure includes the following modules 801 to 810.

A photoelectric signal acquisition module 801 is configured to acquire a collection parameter and collect, based on the collection parameter, a photoelectric signal of the value document.

A digital compensation module 802 is configured to acquire a photoelectric signal correction amount and perform, based on the photoelectric signal correction amount, digital compensation on the photoelectric signal.

A feature extraction module 803 is configured to perform feature extraction on the photoelectric signal subjected to the digital compensation to obtain a feature vector.

A recognition module 804 is configured to input the feature vector to a preset classifier for recognition, to obtain a recognition result of the value document.

A specific region acquisition module 805 is configured to acquire, based on the recognition result, a specific region on the value document.

A feature information acquisition module 806 is configured to acquire, based on the specific region, feature information of the photoelectric signal of the value document.

An accumulation component and differential error calculation module 807 is configured to calculate, based on the feature information, an accumulation component and a differential error of the value document.

A total correction amount calculation module 808 is configured to calculate, based on the accumulation component and the differential error, a total correction amount of the photoelectric signal.

An updating module 809 is configured to update, based on the total correction amount, the photoelectric signal correction amount and the collection parameter.

A recognition result output module 810 configured to output the recognition result.

In the embodiment, the accumulation component and differential error calculation module 807 includes the following units 8071 to 8073.

A feature component calculation unit 8071 is configured to calculate, based on the feature information, a feature component $M_n$ of the photoelectric signal, where the feature component is expressed by:

$$M_n = \sum_{i=1}^{t} \frac{\theta_i}{t},$$

$\theta_i$ represents the feature information, i=1, 2, . . . , t.

An accumulation component calculation unit 8072 is configured to calculate the accumulation component $$M_1 = \sum_{i=1}^{t} \frac{m_i}{2^{t-i+1}}$$

of the value document, where $m_i$ represents a value of the feature component $M_n$ at a time i.

A differential error calculation unit 8073 is configured to calculate the differential error of the value document according to $M_w = M_n - M_1$.

In the embodiment, the total correction amount calculation module 808 includes the following units 8081 to 8083.

A second correction amount calculation unit 8081 is configured to calculate, based on the accumulation component, a second correction amount $M_2$ of the photoelectric signal according to $M_2 - k_2 * (M^* - M_1)$, where $M^*$ represents a preset standard information, and $k_2$ represents a preset second coefficient.

A third correction amount calculation unit 8082 is configured to calculate, based on the differential error, a third correction amount $M_3$ of the photoelectric signal in the way that: if $\cdot|M_w| < w$, the third correction amount is calculate by $M_3 = -M_w$; and if $|M_w| \geq w$ and the number of samples of the photoelectric signal satisfying the condition $|M_w| \geq w$ is n, the third correction amount is calculated by $M_3 = 0$ in a case of $n/N < 0.1$, and the third correction amount is calculated by $M_3 = -k_3 * M_w$ in a case of $n/N \geq 0.1$, where N represents a total number of the samples of the photoelectric signal, $k_3$ represents a preset third coefficient.

A total correction amount calculation unit 8083 is configured to obtain, based on the accumulation component, the second correction amount and the third correction amount, the total correction amount according to $M=M_1+M_2+M_3$.

In the embodiment, the updating module 809 includes the following units 8091 and 8092.

A photoelectric signal correction amount updating unit 8091 is configured to update the photoelectric signal correction amount $M_0$ to be equal to the total correction amount M.

A collection parameter updating unit 8092 is configured to initialize the collection parameter $E_0$ and updating the collection parameter according to $E_o=E_o+\lambda\cdot M_o$, where an initialization value of $E_0$ is preset, and $\lambda$ represents a preset correction coefficient.

In the embodiment, the device may further includes the following modules 811 and 812.

A collection parameter initialization value acquisition module 811 is configured to acquire a preset initialization value of the collection parameter in the first collection of the photoelectric signal of the value document.

A correction amount initialization value acquisition module 812 is configured to acquire an initialization value of the photoelectric signal correction amount in the first collection of the photoelectric signal of the value document, where the initialization value of the photoelectric signal correction amount is zero.

It is clearly known by those skilled in the art that for convenience and conciseness of description, operating processes of the system, the device and the unit described above are not described repeatedly here, and one may refer to corresponding processes in the method embodiments described above for details.

It should be understood that, according to the embodiments of the present disclosure, the disclosed system, device and methods may be implemented in other ways. For example, the described device embodiment is merely for illustration. For example, the units are divided merely based on logical functions, and the units may be divided with other division manner in practice. For example, multiple units or modules may be combined, or may be integrated into another system, or some features may be omitted or not be implemented. In addition, the displayed or discussed couplings, direct couplings or communication connections may be implemented as indirect couplings or communication connections via some interfaces, devices or units, which may be electrical, mechanical or in other forms.

The units described as separate components may be or not be separated physically. The components shown as units may be or not be physical units, i.e., the units may be located at one place or may be distributed onto multiple network units. All of or part of the units may be selected based on actual needs to implement the solutions according to the embodiments.

In addition, function units according to the embodiments of the present disclosure may be integrated in one processing unit, or the units may exist separately, or two or more units may be integrated in one unit. The integrated unit may be implemented in a form of hardware or a software function unit.

If the integrated units are implemented in the form of software function unit and the software function unit is sold or used as separate products, the software function unit may also be stored in a computer readable storage medium. Based on such understanding, an essential part of the technical solutions of the present disclosure, i.e., the part of the technical solutions of the present disclosure that contribute to the existing technology, or all or a part of the technical solutions may be embodied in the form of a computer software product. The computer software product is stored in a storage medium, and includes several instructions for instructing a computer device (which may be a personal computer, a server, a network device or the like) to implement all or a part of the steps of the methods according to the embodiments of the present disclosure. The foregoing storage medium includes various media that can store program codes, for example, a USB disk, a mobile hard disk, a read-only memory (ROM), a random access memory (RAM), a magnetic disk, an optical disk.

For the above, the above-described embodiments are merely illustrative of the technical solution of the disclosure and are not intended to be limiting thereof. Although the disclosure is described in detail with reference to the above-described embodiments, it should be understood by those skilled in the art that the technical solution described in the above-described embodiments can be modified or some of the technical features of the technical solution can be equivalently replaced, and these modifications or substitutions do not depart from the spirit and scope of the technical solution of the various embodiments of the present disclosure.

The invention claimed is:

1. A method for adaptively recognizing a value document, comprising:

acquiring a collection parameter, and collecting, based on the collection parameter, a photoelectric signal of the value document;

acquiring a photoelectric signal correction amount, and performing, based on the photoelectric signal correction amount, digital compensation on the photoelectric signal;

performing feature extraction on the photoelectric signal subjected to the digital compensation to obtain a feature vector;

inputting the feature vector to a preset classifier for recognition, to obtain a recognition result of the value document;

acquiring, based on the recognition result, a specific region on the value document;

acquiring, based on the specific region, feature information of the photoelectric signal of the value document;

calculating, based on the feature information, an accumulation component and a differential error of the value document;

calculating, based on the accumulation component and the differential error, a total correction amount of the photoelectric signal;

updating, based on the total correction amount, the photoelectric signal correction amount and the collection parameter; and outputting the recognition result.

2. The method according to claim 1, wherein a correction equation for the digital compensation is expressed by:

$$p'=p+M_0$$

where p represents a grey value of the photoelectric signal at any point, p' represents a corrected value of p, and $M_0$ represents the photoelectric signal correction amount.

3. The method according to claim 1, wherein the calculating, based on the feature information, the accumulation component and the differential error of the value document comprises:

calculating, based on the feature information, a feature component $M_n$ of the photoelectric signal, wherein the feature component is expressed by:

$$M_n = \sum_{i=1}^{t} \frac{\theta_i}{t},$$

where $\theta_i$ represents the feature information, i=1, 2, . . . , t;

calculating the accumulation component $$M_1 = \sum_{i=1}^{t} \frac{m_i}{2^{t-i+1}}$$

of the value document, where $m_i$ represents a value of the feature component $M_n$ at a time i; and calculating the differential error of the value document according to $M_w=M_n-M_1$.

4. The method according to claim 3, wherein the calculating, based on the accumulation component and the differential error, the total correction amount of the photoelectric signal comprises:

calculating, based on the accumulation component, a second correction amount $M_2$ of the photoelectric signal according to $M_2=k_2*(M^*-M_1)$, where $M^*$ represents a preset standard information, and $k_2$ represents a preset second coefficient;

calculating, based on the differential error, a third correction amount $M_3$ of the photoelectric signal in the way that: if ·$|M_w|<w$, the third correction amount is calculated by $M_3=-M_w$; and if $|M_w|\geq w$ and the number of samples of the photoelectric signal satisfying the condition $|M_w|\geq w$ is n, the third correction amount is calculated by $M_3=0$ in a case of $n/N<0.1$, and the third correction amount is calculated by $M^3--k_3*M_w$ in a case of $n/N\geq 0.1$, where N represents a total number of the samples of the photoelectric signal, and $k_3$ represents a preset third coefficient; and obtaining, based on the accumulation component, the second correction amount and the third correction amount, the total correction amount according to $M=M_1+M_2+M_3$.

5. The method according to claim 4, wherein the updating, based on the total correction amount, the photoelectric signal correction amount and the collection parameter comprises:

updating the photoelectric signal correction amount $M_0$ to be equal to the total correction amount M; and initializing the collection parameter and updating the collection parameter according to $E_o=E_o+\lambda\cdot M_o$, wherein an initialization value of $E_0$ is preset, and $\lambda$ represents a preset correction coefficient.

6. The method according to claim 1, wherein before the performing, based on the photoelectric signal correction amount, the digital compensation on the photoelectric signal, the method further comprises:

acquiring a first correction coefficient and a second correction coefficient which are preset;

performing, based on the first correction coefficient and the second correction coefficient, signal compensation on the photoelectric signal according to the following compensation correction equation:

$$y=a\cdot x+b$$

where x represents an uncorrected value of the photoelectric signal at any point, y represents a corrected value of the photoelectric signal at the point, a represents the first correction coefficient, and b represents the second correction coefficient.

7. The method according to claim 1, comprising:

acquiring, in the first collection of the photoelectric signal of the value document, a preset initialization value of the collection parameter and an initialization value of the photoelectric signal correction amount, wherein the initialization value of the photoelectric signal correction amount is zero.

8. A device for adaptively recognizing a value document, comprising:

a photoelectric signal acquisition module configured to acquire a collection parameter and collect, based on the collection parameter, a photoelectric signal of the value document;

a digital compensation module configured to acquire a photoelectric signal correction amount and perform, based on the photoelectric signal correction amount, digital compensation on the photoelectric signal;

a feature extraction module configured to perform feature extraction on the photoelectric signal subjected to the digital compensation to obtain a feature vector;

a recognition module configured to input the feature vector to a preset classifier for recognition, to obtain a recognition result of the value document;

a specific region acquisition module configured to acquire, based on the recognition result, a specific region on the value document;

a feature information acquisition module configured to acquire, based on the specific region, feature information of the photoelectric signal of the value document;

an accumulation component and differential error calculation module configured to calculate, based on the feature information, an accumulation component and a differential error of the value document;

a total correction amount calculation module configured to calculate, based on the accumulation component and the differential error, a total correction amount of the photoelectric signal;

an updating module configured to update, based on the total correction amount, the photoelectric signal correction amount and the collection parameter; and a recognition result output module configured to output the recognition result.

9. The device according to claim 8, wherein:

the accumulation component and differential error calculation module comprises:

a feature component calculation unit configured to calculate, based on the feature information, a feature component $M_n$ of the photoelectric signal, wherein the feature component is expressed by:

$$M_n = \sum_{i=1}^{t} \frac{\theta_i}{t},$$

$\theta_i$ represents the feature information, i=1, 2, . . . , t;

an accumulation component calculation unit configured to calculate the accumulation component of the value document, wherein the accumulation component is expressed by:

$$M_1 = \sum_{i=1}^{t} \frac{m_i}{2^{t-i+1}},$$

$m_i$ represents a value of the feature component $M_n$ at a time i; and a differential error calculation unit configured to calculate the differential error of the value document according to $M_w = M_n - M_1$, the total correction amount calculation module comprises:

a second correction amount calculation unit configured to calculate, based on the accumulation component, a second correction amount $M_2$ of the photoelectric signal according to $M_2 = k_2*(M^* - M_1)$ where $M^*$ represents a preset standard information, and $k_2$ represents a preset second coefficient;

a third correction amount calculation unit configured to calculate, based on the differential error, a third correction amount $M_3$ of the photoelectric signal in the way that: if $|M_w| < w$, the third correction amount is calculated by $M_3 = -M_w$; and if $|M_w| \geq w$ and the number of samples of the photoelectric signal satisfying the condition $|M_w| \geq w$ is n, the third correction amount is calculated by $M_3 = 0$ in a case of $n/N < 0.1$, and the third correction amount is calculated by $M_3 = -k_3*M_w$ in a case of $n/N \geq 0.1$, where N represents a total number of the samples of the photoelectric signal, $k_3$ represents a preset third coefficient; and a total correction amount calculation unit configured to obtain, based on the accumulation component, the second correction amount and the third correction amount, the total correction amount according to $M = M_1 + M_2 + M_3$, and the updating module comprises:

a photoelectric signal correction amount updating unit configured to update the photoelectric signal correction amount $M_0$ to be equal to the total correction amount M; and a collection parameter updating unit configured to initialize the collection parameter and update the collection parameter according to $E_o = E_o + \lambda \cdot M_o$, wherein an initialization value of $E_0$ is preset, and $\lambda$ represents a preset correction coefficient.

10. The device according to claim 8, further comprising:

a collection parameter initialization value acquisition module configured to acquire a preset initialization value of the collection parameter in the first collection of the photoelectric signal of the value document; and a correction amount initialization value acquisition module configured to acquire an initialization value of the photoelectric signal correction amount in the first collection of the photoelectric signal of the value document, wherein the initialization value of the photoelectric signal correction amount is zero.

* * * * *